Patented Jan. 28, 1941

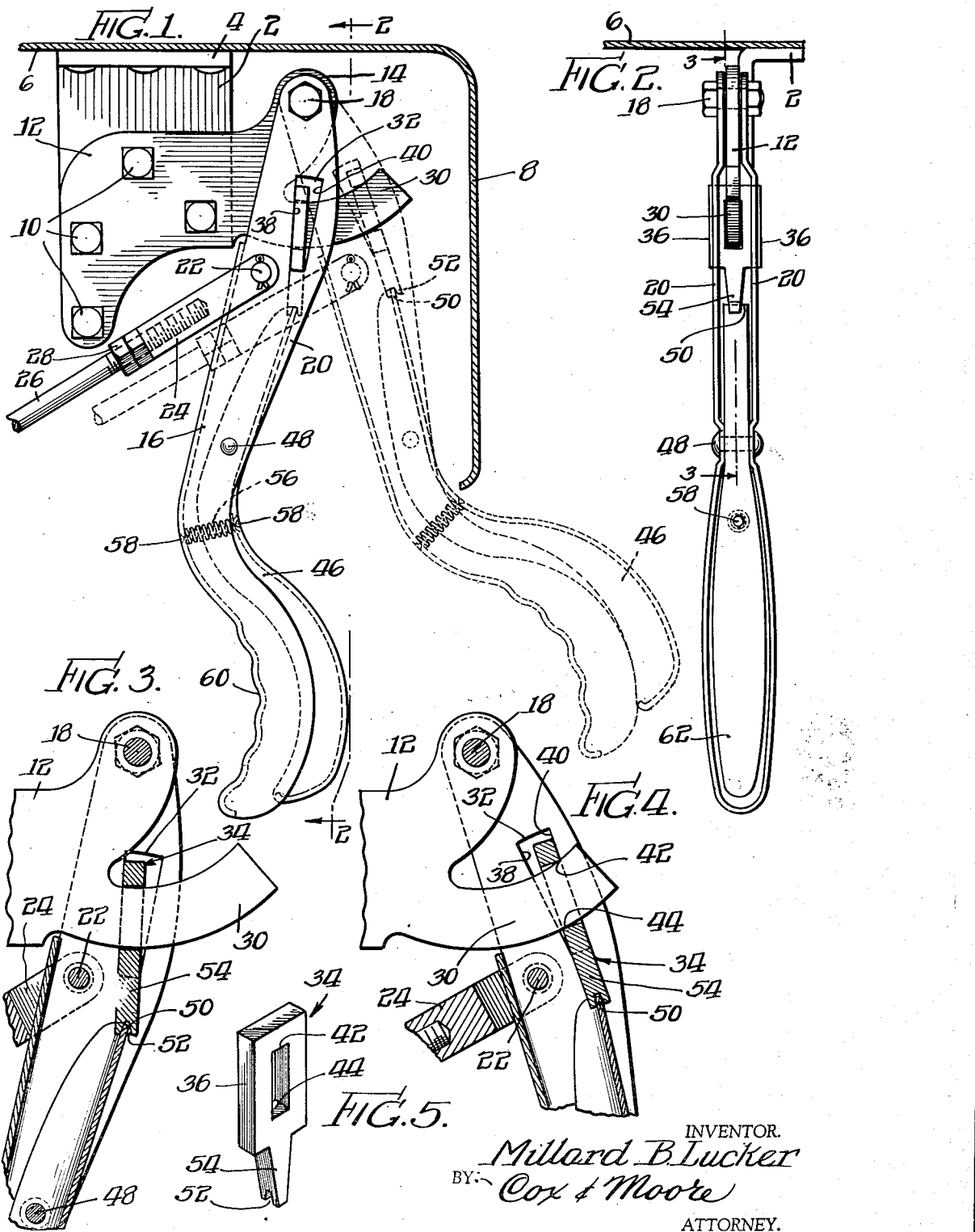

2,229,857

UNITED STATES PATENT OFFICE 2,229,857

BRAKE CONTROL MECHANISM

Millard B. Lucker, St. Joseph, Mich., assignor to Auto Specialties Manufacturing Company, St. Joseph, Mich., a corporation of Michigan Application January 19, 1938, Serial No. 185,741

4 Claims. (Cl. 74—531)

This invention relates to brake operating or control mechanism and particularly to such a mechanism for operating the emergency brake of an automobile.

The common type of emergency brake control mechanism as employed at the present time comprises a hand lever carrying a spring pressed pawl which, in engaging the teeth of a ratchet, maintains the brake in set position. With such mechanism it often happens that when the lever has been moved to the position where the brakes are sufficiently tight, the pawl is between a pair of teeth on the ratchet; therefore the lever must be moved in a releasing direction to cause the pawl to engage the forward tooth of the pair of teeth or it must be moved rearwardly to engage it with the rearward tooth of the pair of teeth. If the lever is released to engage the forward tooth, the brakes will not be set in sufficiently tight position to hold the automobile on a hill and therefore the automobile, when no attendant is present, may become a menace to traffic and may coast down the hill and become wrecked. If the lever is pulled rearwardly to engage the rearward tooth, then the subsequent release of the brake is hard to effect. Furthermore, in the case of the present type brake control mechanism, the teeth of the ratchet are subject to considerable wear and are often chipped, thereby preventing holding of the brake in set position.

It is accordingly an object of this invention to eliminate the disadvantages of the aforementioned type brake control mechanism by providing a mechanism which is capable of being adjusted and locked in substantially any operative position to set and maintain the brakes in said position, which mechanism is simple and rugged and composed of a minimum number of parts.

Among the other objects of my present invention are to provide an improvement over the constructions set forth and claimed in my prior pending applications, Serial No. 149,875, filed June 23, 1937, and application Serial No. 179,379, filed December 13, 1937, both of said applications being entitled "Brake control mechanism," and more specifically to provide improved means for maintaining the elements of the locking mechanism in proper operative position at all times regardless of their relative path of movement during the setting and release of the brakes.

Another object of my invention is to provide a braking mechanism of an improved type wherein the brake is applied by the actuation of an operating lever and wherein a locking member is mounted on a portion of the lever for arcuate movement therewith and engages with a cooperative locking means which is so arranged as to be engageable therewith at substantially all pivotal positions of the lever.

Among the additional objects of my invention are to provide improved braking mechanism which may be positively locked in substantially any position of adjustment against retrograde movement and which may be made by stamping or otherwise forming from sheet stock; to provide an improved locking element having opposed, substantially parallel locking edges adapted to engage the corresponding flat edge portions of a cooperating locking means; and to provide a mechanism such as the above, having a locking element which is readily releasable by easily operable means for instantly releasing the brake setting in any adjusted position to permit release of the brake.

Yet other and further objects and advantages of the invention will be apparent from the following description, taken in connection with the accompanying drawing:

Fig. 1 is an elevational view of a brake control mechanism constructed in accordance with the present invention and is shown as applied to the dash of an automobile;

Fig. 2 is an elevation taken on the line 2—2 in Fig. 1;

Fig. 3 is a fragmentary sectional view taken on the line 3—3 in Fig. 2;

Fig. 4 is a fragmentary sectional view the same as Fig. 3, but showing the parts in locked position; and Fig. 5 is a perspective view of the locking cam member.

As shown in Fig. 1, a bracket member 2 having a turned over flange portion 4 for connection to the cowl of an automobile at a point behind the dash 8, is rigidly bolted as at 10 to a second bracket member 12 comprising a flat sheet of material. The second bracket member has a rearwardly and upwardly extending projecting lug portion 14 upon which is fulcrumed the upper bifurcated end of the lever 16 through the agency of the pivot bolt 18. It will be noted that the lever 16 comprises opposed side walls 20, providing an enclosure for a purpose to be hereinafter described more in detail. The opposed side walls 20 are provided with aligned apertures to receive the pin 22, upon which is mounted an attaching clevis 24 by which the brake operating cable or rod 26 is secured to the lever 16. Attention is directed to the fact that the end of the clevis 24, in engaging the attaching pin 22, straddles the sides of the lever 16. Jam nuts 28 provide for adjustment of the control rod 26.

The bracket member 12 is further provided with a curved rearwardly extending arm 30 which is a flat, integral extension of the sheet material of the bracket. Attention is particularly directed to the fact that the curved arm 30 has upper and lower edges which are parallel and which are formed on curves corresponding to the arcs of circles drawn with the pivot 18 as a center. Accordingly, the arm 30 provides a curved segmental bar which is arranged intermediate of the bifurcated end of the lever throughout its normal arc of movement.

The side walls 20 of the lever 16 are provided with aligned apertures 32 in which is mounted the locking or cam member 34, shown in disassembled relationship in Fig. 5. This locking or cam member is formed of flat stock and has a generally rectangular peripheral form, as well as a rectangular aperture corresponding generally to the cross-sectional form of the arm 30, but sufficiently larger than this arm so that the locking member can be mounted relatively loosely thereon. In assembled relationship the vertically extending side portions 36 of the locking member extend through the aligned apertures 32, the locking member being of greater width than the side walls 20 of the lever 16 in order to accomplish this function, as clearly shown in Fig. 2.

The aligned apertures 32, it will be noted, are of converging or wedge shaped configuration, the lower portions thereof, as viewed in Fig. 1, being of substantially the thickness of the locking member but diverging to an increasing width at the top. The left-hand edge 38 of the apertures, as viewed in Fig. 1, is so arranged that when the clamping member 34 resides thereagainst, as shown in Fig. 1, it is positioned substantially radially with respect to the curve of the arm 30, and accordingly is freely movable longitudinally of this arm. The opposite diverging edges 40 of the aperture, however, extend angularly so that when the locking member is shifted to the position shown in Fig. 4, it will be canted or tilted with respect to the aforesaid curvature of the arm, with the result that the edges 42 and 44 of the locking member will dig into the upper and lower edge surfaces of the segmental arm 30 to lock the lever against retrograde movement with respect thereto. Attention is particularly directed to the fact that the edges 42 and 44 are substantially parallel and that they are located adjacent opposite faces of the member 34, with the result that the locking stresses are concentrated in opposite directions over a predetermined line of contact.

While the locking member shown is perfectly flat, the present invention also comprehends the provision of such members having their opposite surfaces relieved adjacent the edges 42 and 44, or being otherwise distorted to bring the locking edges more nearly toward the central plane of the element, since it has been found that this arrangement results in a more positive and secure locking action.

The locking of the brake against retrograde movement is controlled through the agency of a second lever 46 pivotally mounted between the opposite side walls 20 of the lever 16 upon the pivot pin 48. The lever 46 is of generally channel-shaped configuration and the upper edge 50 of the base of the channel section engages in the grooved or bifurcated portion 52 of the arm 54 which integrally extends from the periphery of the locking member 34, as clearly shown in all figures.

A compression spring 56, mounted between the levers 16 and 46, is positioned by the opposed indented convexities 58 and tends to force the two levers apart at the position shown in Fig. 1, with the result that the upper edge 50 of the lever normally maintains the locking member 34 against the edges 40 of the confining apertures, in which position the parts reside relatively as shown in Fig. 4 and in the dotted lines in Fig. 1. In this position the edges 42 and 44 interlock with the segment or arm 30 in such a manner as to effectually prevent retrograde movement of the brake control lever.

It will be obvious from the above disclosure that the locking member or cam is in effect mounted for limited pivotal movement upon the side walls 20 of the lever 16, and more specifically from a position in alignment with the radius of the bar 30 to a relatively canted or tilted position.

In operation of the device and with the brakes of the vehicle, for example, released, the lever 16 will normally reside in the position shown in Fig. 1, but with the parts retained in locking position through the agency of the spring 56. When it is desired to apply the brakes it is only necessary for the operator to grasp the forward side of the handle portion 60 of the lever 16 in order to draw the lever rearwardly about the pivot 18, thus tensioning the cable or rod 26 for positively actuating the brake applying member. It should be noted that in applying the brakes it is not normally essential to actuate the cam or locking release lever 46 since this latter member can be relatively freely moved in a rearward direction with respect to the bar 30, as clearly shown in the figures.

With the brakes applied the parts will be in the position shown in Fig. 4 and in the dotted lines in Fig. 1. To release the brakes the handles 60 and 62 of both levers are grasped and compressed so that the handle 42 is moved forwardly, its opposite end 50 thus moving through a short rearward arc and pivoting the locking member 34 from the dotted line to the full line position shown in Fig. 1. With the parts so maintained the lever may be moved forwardly to release the brake.

The present invention provides a rugged, highly simplified brake control means which may be locked against retrograde movement in substantially any position. By mounting one of the interengaging locking members directly upon the lever and forming the complementary locking element in accordance with the relative path of movement, numerous additional parts may be omitted from the structure. The simplicity and compactness of the device renders it adaptable to substantially any convenient position in a vehicle. The parts may be so constructed as to be very little susceptible to wear, replacement thereof being a relatively easy matter. The parts may be all readily stamped and formed from sheet material.

While in the preferred embodiment disclosed the main lever 16 has been shown as being positioned forwardly of the control lever 40, it will be obvious, in accordance with the spirit of this disclosure, that the positions of these parts may be reversed, or the handles be otherwise arranged in accordance with the convenience of the operator.

Changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A brake control mechanism comprising a brake control lever, a fixed bar extending substantially parallel to the path of movement of said lever and in transverse spaced relation to the leg of the lever, said leg of the lever having an opening therein, a friction detent having an enlarged opening receiving said bar and having a portion received in the opening in the lever whereby said detent is moved longitudinally of said bar by engagement of one or the other of opposed walls of the opening in said leg of the lever with the portion of the detent received in said opening in said leg of the lever, the opening in the lever being relatively greater in width than the thickness of the portion of the detent received therein so as to permit tilting of the detent relative to the bar from a released position into a locking position engaging a wall of the opening in the operating member to prevent retrograde movement of the brake control lever, and a manually operable member carried by said lever for operating said detent to released position to permit movement of the lever in a brake releasing direction.

2. A brake control mechanism comprising a pivoted brake control lever, a fixed segmental bar, said lever being bifurcated and receiving between the furcations thereof said segmental bar, the geometric center of said bar being coincident with the pivot axis of the lever, a friction detent having an enlarged opening receiving said segmental bar and having opposite edge portions received in alined openings provided in the furcations of said lever whereby said detent is moved longitudinally of said bar by said lever, the openings in the furcations of the lever being relatively greater in a direction longitudinally of the bar than the thickness of the edge portions of the detent in this same direction so as to permit tilting of the detent relative to the bar from a released position into a locking position when the lever is moved to brake applying position to prevent retrograde movement of the lever and a second lever pivoted intermediate its ends on said first lever, one end of the second lever extending between the furcations of the first lever and operatively engaging a portion of said detent projecting between the furcations of the lever, for operating said detent to released position permitting movement of the lever in the brake releasing direction.

3. In a control mechanism for a brake applying member, a fixed support, a bar secured to and projecting from said support, a detent tiltably and slidably mounted upon the bar, said detent having an opening receiving said bar and providing opposed bar gripping surfaces, a lever pivoted to said support and having a portion extending in close parallel juxtaposition to the bar, said portion of the lever having an opening therein to receive an edge of the detent, means for connecting the brake applying member to the lever, a detent operating lever pivoted to the first lever and operatively connected to the detent, one wall of the opening in the first lever extending in a predetermined direction transversely of the bar to engage the detent and prevent movement of the detent past bar releasing position, and the opposed wall of said opening in the lever being spaced from the first wall in diverging relation thereto to permit the detent to be moved into bar gripping position.

4. In a control mechanism for a brake applying mechanism, the combination of a support, an arcuate bar secured to said support, a lever pivoted to said support about an axis substantially concentric with the arcuate bar, a bar gripping detent having an enlarged opening receiving said bar, a portion of said lever extending transversely of the bar in parallel relation thereto and having an opening therein to receive an edge of said detent, said opening having opposed diverging walls permitting movement of the detent relative to the lever and the bar from a bar gripping position to a bar releasing position extending radially of the arcuate bar, a trip lever pivotally carried by the first lever and operatively connected to the detent for moving the detent from bar gripping position to bar releasing position, one wall of the opening in said lever extending substantially radially of the bar to prevent movement of the detent by the trip lever beyond the bar releasing position.

MILLARD B. LUCKER.